United States Patent
Kawakami et al.

(10) Patent No.: US 7,725,255 B2
(45) Date of Patent: May 25, 2010

(54) VEHICULAR DISPLAY SYSTEM AND METHOD

(75) Inventors: Hidehiko Kawakami, Nagoya (JP); Hirokazu Shibata, Okazaki (JP); Kiyotaka Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 880 days.

(21) Appl. No.: 11/515,030

(22) Filed: Sep. 5, 2006

(65) Prior Publication Data

US 2007/0055442 A1    Mar. 8, 2007

(30) Foreign Application Priority Data

Sep. 7, 2005   (JP)  ............... 2005-259958

(51) Int. Cl.
*G01C 21/26*   (2006.01)

(52) U.S. Cl. .................. 701/211; 340/995.14

(58) Field of Classification Search ........ None
See application file for complete search history.

(56) References Cited

U.S. PATENT DOCUMENTS

| | | | |
|---|---|---|---|
| 4,812,980 A | | 3/1989 | Yamada et al. |
| 6,076,039 A | * | 6/2000 | Kabel et al. ............... 701/206 |
| 6,224,222 B1 | * | 5/2001 | Inoguchi et al. ........... 362/29 |
| 6,995,661 B2 | * | 2/2006 | Amari ...................... 340/425.5 |
| 7,430,473 B2 | * | 9/2008 | Foo et al. ................... 701/212 |
| 2005/0119799 A1 | * | 6/2005 | Dupont et al. .............. 701/1 |

FOREIGN PATENT DOCUMENTS

| | | |
|---|---|---|
| DE | 19947506 A1 | 4/2001 |
| JP | A-08-063575 | 3/1996 |
| JP | A-09-185696 | 7/1997 |
| JP | A-11-051686 | 2/1999 |
| JP | A-2000-043652 | 2/2000 |
| JP | A-2002-131068 | 5/2002 |
| JP | A-2005-172564 | 6/2005 |

OTHER PUBLICATIONS

U. S. Appl. No. 11,526,617, filed Sep. 26, 2006.
Office Action dated May 27, 2009 from the Japan Patent Office in the corresponding JP application No. 2005-259958 (and English Translation).

* cited by examiner

*Primary Examiner*—Michael J. Zanelli
(74) *Attorney, Agent, or Firm*—Posz Law Group, PLC

(57) ABSTRACT

A vehicular display system includes an in-vehicle navigation device and a vehicular meter device. The in-vehicle navigation device includes a display device, a character string storing device, and a character string converting device. The character string storing device stores a navigation display character string that is to be displayed in the display device. The character string converting device converts the navigation display character string into a meter display character string. The vehicular meter device includes a navigation display area. The meter display character string is displayed in a navigation display area.

18 Claims, 7 Drawing Sheets

| ID | NAVIGATION DISPLAY CHARACTER STRING | METER DISPLAY CHARACTER STRING |
|---|---|---|
| 0001 | SHOWA TOWN, 1 CHOME | SHOWA 1 |
| 0002 | NAGOYA STATION | MEI-EKI |
| 0003 | TOKYO DISNEY LAND | TDL |
| 0004 | KARIYA POST OFFICE | 〒 |
| 0005 | CENTRAL JAPAN INTERNATIONAL AIRPORT | CENTRAIR |

FIG. 6

| ID | NAVIGATION DISPLAY CHARACTER STRING | TYPE | SIMPLIFIED/ SHORTENED NAME | RANK |
|---|---|---|---|---|
| 0001 | SHOWA TOWN, 1 CHOME | ADDRESS | NONE | A |
| 0002 | NAGOYA STATION | NAME OF STATION | MEI-EKI | A |
| 0003 | TOKYO DISNEY LAND | LEISURE FACILITIES | TDL | A |
| 0004 | KARIYA POST OFFICE | POST OFFICE | NONE | C |
| 0005 | CENTRAL JAPAN INTERNATIONAL AIRPORT | AIRPORT | CENTRAIR | A |

VEHICULAR DISPLAY SYSTEM AND METHOD

CROSS REFERENCE TO RELATED APPLICATION

This application is based on and incorporates herein by reference Japanese Patent Application No. 2005-259958 filed on Sep. 7, 2005.

FIELD OF THE INVENTION

The present invention relates to a vehicular display system and method.

BACKGROUND OF THE INVENTION

Recently, besides a conventional mechanical meter, an image display device using a liquid crystal panel or the like, has been employed as a display device for a vehicular meter panel. The image display device has an advantage of fully controlling a setting of a display design and a layout.

This image display device has been developed into a vehicular display device, which displays a screen such as an area map or road map of an in-vehicle navigation device. However, at times, an area for displaying the screen of the in-vehicle navigation device is smaller than that of a normal in-vehicle navigation device. As a result, characters of names of cities, towns and villages, names of roads, and the like are sometimes illegible to a user.

Figure 11:
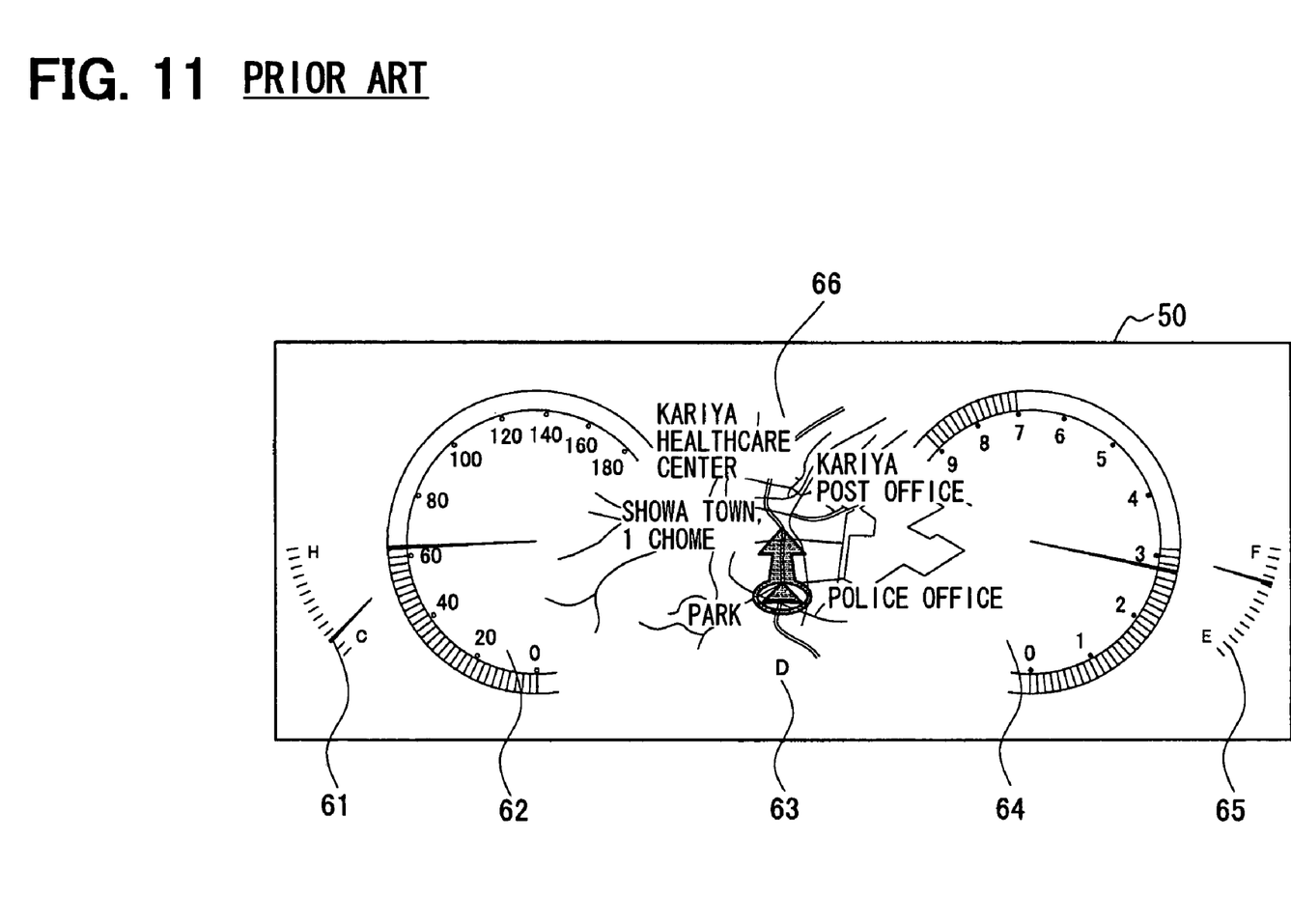
FIG. 11 is a schematic view showing an exemplary display of a conventional meter in the embodiment.

In an exemplary display of a conventional meter, as shown in FIG. 11, display areas of a meter unit 50 include a water temperature display area 61, a speed display area 62, a shift position etc. display area 63, an engine speed display area 64, a fuel level gauge display area 65, and a navigation display area 66. According to this conventional art, navigation map drawing data (a navigation display character string) is identical with meter map drawing data (a meter display character string). Thus, the character string, which is similar to that of a navigation device, is displayed on the navigation display area 66, which is very limited in area.

Consequently, U.S. Pat. No. 4,812,980 (JP10-091063A) proposes a map display device, which facilitates the user reading the characters.

According to the map display device in U.S. Pat. No. 4,812,980, the single in-vehicle navigation device changes a character string and the number of characters in proportion to the scale of the map, thereby obtaining a map display that is easy to read to the user. However, it does not work together with other devices.

Furthermore, even if character strings are converted, it does not facilitate adequate legibility of the characters, since, for instance, the character strings may be displayed with a part of them overlapped in a screen display of the in-vehicle navigation device of a meter.

SUMMARY OF THE INVENTION

The present invention addresses the above disadvantages. Thus, it is an objective of the present invention to provide a vehicular display system and method, which provides map information that is easy-to-read to a user.

To achieve the objective, there is provided a vehicular display system including an in-vehicle navigation device and a vehicular meter device. The in-vehicle navigation device includes a display for displaying first map data, a character string storing means for storing the first map data that is to be displayed on the display, and a transmitting means for transmitting map data to the vehicular meter device. The first map data includes first character string data. The vehicular meter device includes a receiving means for receiving the map data from the in-vehicle navigation device, and a navigation display area for displaying second map data. The second map data includes second character string data. A character string converting means for converting the first map data into the second map data is included in the in-vehicle navigation device and/or the vehicular meter device. The second character string data is displayed in a simpler form than the first character string data in the navigation display area.

To achieve the objective, there is also provided a vehicular meter device including a receiving means for receiving first map data from an output medium, a character string converting means for converting the first map data into second map data, and a navigation display area for displaying the second map data. The first map data includes first character string data, and the second map data includes second character string data. The second character string data is displayed in a simpler form than the first character string data in the navigation display area.

There is further provided a method for displaying a travel guidance map in a vehicle that has a navigation system and a meter display device. The method includes producing display data including map data of a travel guidance map and first character string data. The first character string data indicates a specified name for an indication of the specified name in a first form on the travel guidance map, the map data and the first character string data being stored in a memory of the navigation system. The method also includes converting the produced character string data into a second character string data to indicate the specified name in a second form simpler than the first form. The method further includes displaying, in a meter display device, both the travel guidance map and the specified name in the second form. Both the travel guidance map and the specified name in the second form are displayed based on the map data and the second character string data in addition to display items of the meter display device.

BRIEF DESCRIPTION OF THE DRAWINGS

The invention, together with additional objectives, features and advantages thereof, will be best understood from the following description, the appended claims and the accompanying drawings. In the drawings:

DETAILED DESCRIPTION OF THE INVENTION

Figure 1:
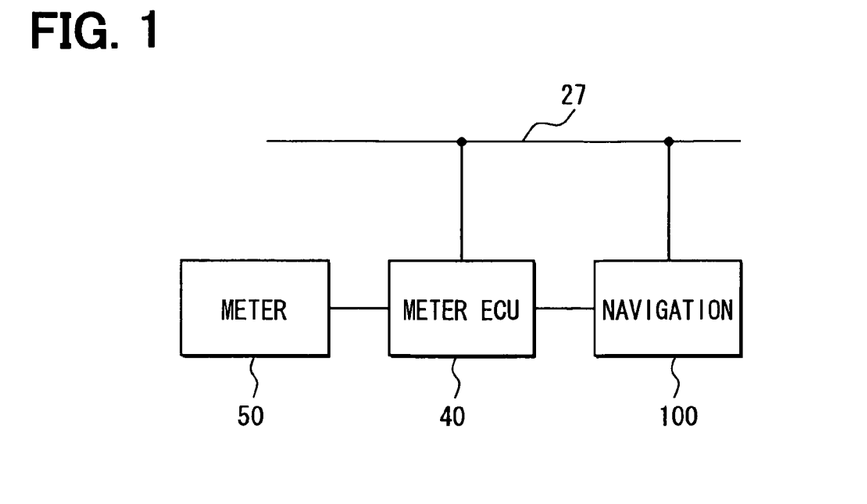
FIG. 1 is a block diagram showing a vehicular display system according to an embodiment of the present invention.

Referring to FIG. 1, a vehicular display system includes a meter ECU 40, a meter unit 50, and an in-vehicle navigation device 100. The meter ECU 40 and the navigation device 100 are connected by an in-vehicle local area network (LAN) 27. Alternatively to the in-vehicle LAN 27, a dedicated cable may be employed in transmitting data according to contents of data.

Figure 2:
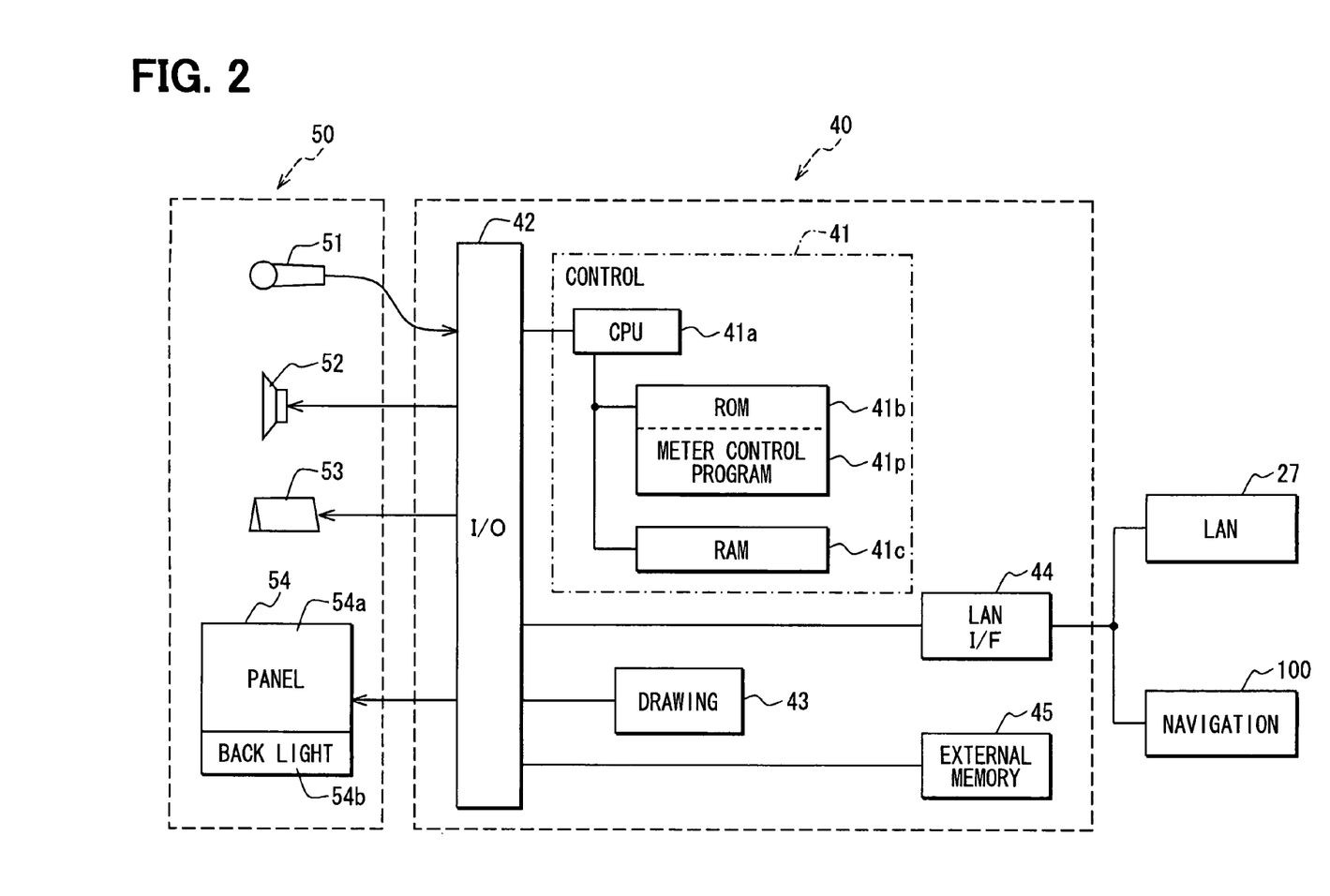
FIG. 2 is a block diagram showing a meter ECU and a meter in the embodiment.

As shown in detail in FIG. 2, the meter ECU 40 includes a control part 41, an I/O 42, a drawing part 43, a LAN I/F 44, and an external memory 45. The drawing part 43, the LAN I/F 44, and the external memory 45 are connected to the control part 41 through the I/O 42.

The control part 41, which is a meter character string converting device, includes a CPU 41a, a ROM 41b, a RAM 41c, and a peripheral circuitry (not shown) such as an A/D converter, all of which are well known. The ROM 41b stores various data and a meter control program 41p that is used for executing various types of processing, which is performed by the meter ECU 40.

The drawing part 43 produces drawing data used for a display in the meter unit 50 based on data required for a meter display, which has been obtained from, for example, the in-vehicle LAN 27. Also, the drawing part 43 stores data used for the display and for a display color. The data to be obtained is on, for instance, engine water temperature, an engine rotation speed, a vehicle speed, a shift position, a mileage, a date and time, and a residual fuel.

The LAN I/F 44 exchanges the data with the in-vehicle LAN 27.

The external memory 45, which is a character string storing device, that is, a meter character string conversion database, includes an electrically erasable and programmable read only memory (EEPROM) and a rewritable semiconductor memory such as a flash memory. The external memory 45 stores information and data required for an operation of the meter ECU 40. In addition, the external memory 45 is designed to retain memory contents even though the meter ECU 40 falls into an off-state.

The meter unit 50 includes a microphone 51, a speaker 52, an LED 53, and a display device 54. The meter unit 50 displays an image defined by the drawing data, which has been produced by the meter ECU 40.

The microphone 51 is used, for example, as a part of a voice input device of the navigation device 100. Instead of using the in-vehicle LAN 27, voice data that has been inputted into the microphone 51 may be transmitted directly to the navigation device 100.

The speaker 52 transmits a voice message from various types of in-vehicle equipment. The speaker 52 transmits the voice message of the navigation device 100. Additionally, the speaker 52 and the navigation device 100 may be directly connected to the use of the in-vehicle LAN 27.

The LED 53 is used mainly, for instance, as a direction indicator lamp, an operation monitor lamp and a warning lamp.

The display device 54 includes a panel 54a (e.g., a well-known color liquid crystal display), a back light 54b, and a driver circuit (not shown) to control the liquid crystal display. An active matrix drive system, for example, may be employed for the driver circuit. The active matrix drive system allows ensuring that a target pixel is lit or extinguished by applying a transistor to each pixel. The display is performed by the driver circuit based on a drawing command and the drawing data that have been transmitted from the meter ECU 40. Alternatively, an organic EL (ElectroLuminescence) indicator or a plasma indicator may be substituted for the display device 54. Moreover, other elements than a navigation display area 66 (FIG. 9) may be replaced with a well-known mechanical meter.

Figure 4:
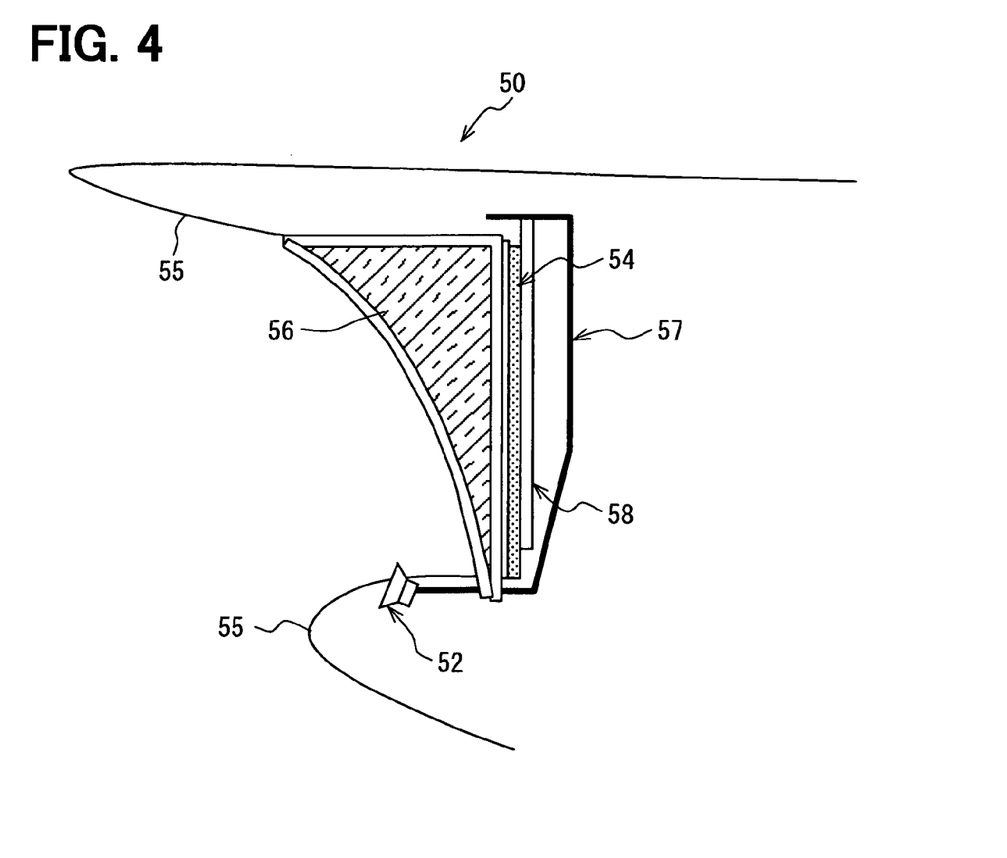
FIG. 4 is a cross-sectional view of a meter in the embodiment.

The meter unit 50 may be constructed as shown in FIG. 4. The display device 54, a meter board 58 (which includes the driver circuit and the like), the LED 53 (not shown) and the like are received in a case 57, which is attached to a predetermined position of a dash panel. Upper and lower parts of the case 57 are covered with a meter hood 55 to improve visibility of the meter unit 50, as a result of reducing mainly reflection and glare of light. A lens 56 is attached to a front side of the display device 54 so that a driver can readily read the display indicated at an appropriate magnification.

Figure 3:
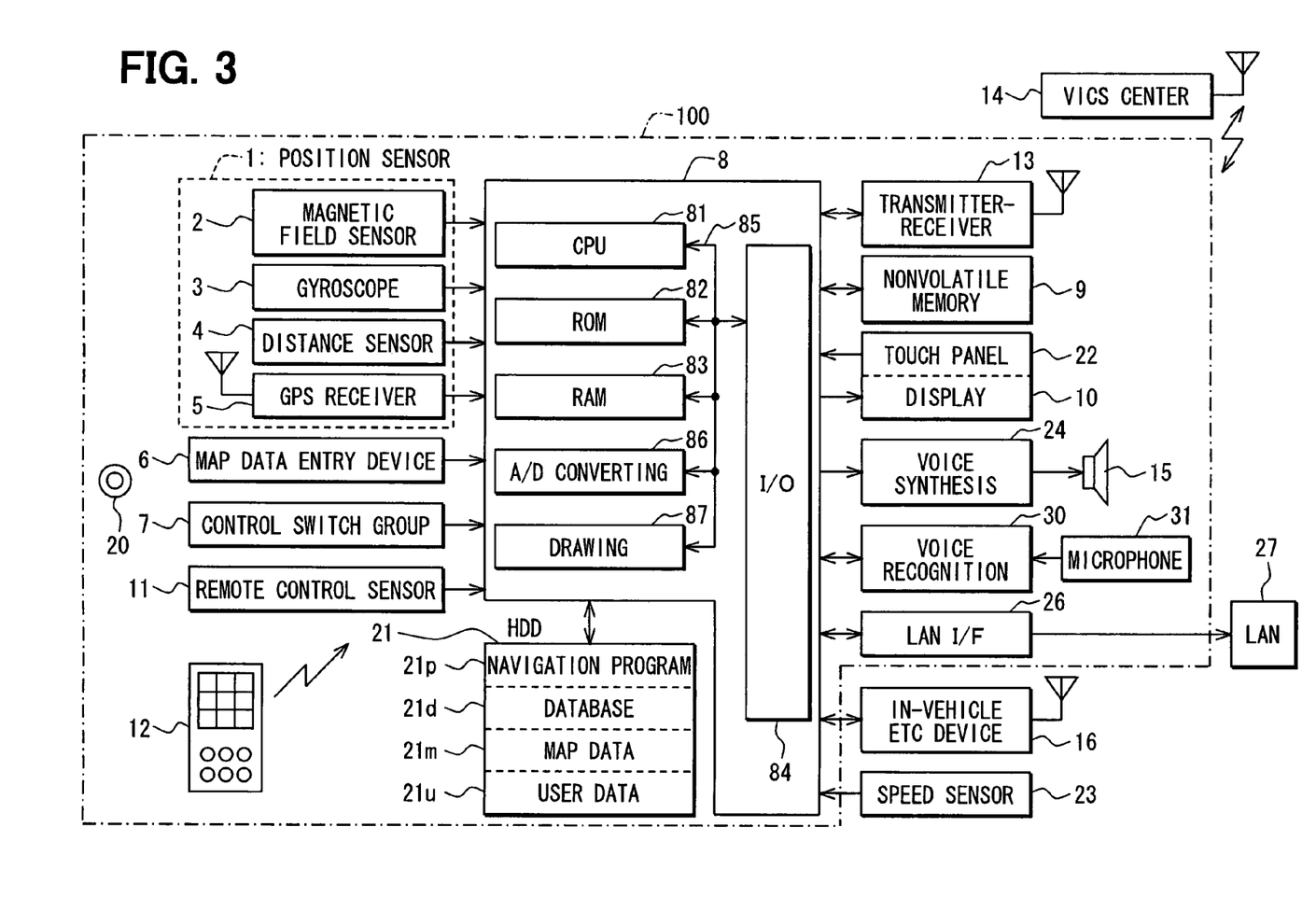
FIG. 3 is a block diagram showing an in-vehicle navigation device in the embodiment.

The navigation device 100 includes, as shown in FIG. 3, a position sensor 1, a map data entry device 6, a control switch group 7, a remote control sensor 11, a voice synthesis circuit 24 and a speaker 15 that provide an audio assist, a nonvolatile memory 9, a display device 10, a hard disk device (HDD) 21, a control circuit 8 that is connected to the above elements, and a remote control terminal 12.

The position sensor 1 includes a magnetic field sensor 2, a gyroscope 3, a distance sensor 4, and a GPS receiver 5, all of which are well known. The GPS receiver 5 detects a position of a vehicle based on a radio wave from a satellite. Since these elements 2, 3, 4, 5 have errors with their properties different from each other, the elements 2, 3, 4, 5 are configured such that a plurality of the sensors complement one another. In addition, depending on accuracy, a part of the above sensors may constitute the position sensor 1. Furthermore, a rotation sensor of a steering, and a wheel sensor of each rolling wheel (e.g., a speed sensor 23) may be employed for constituting the position sensor 1.

A touch panel 22 integrated with the display device 10, or a mechanical switch, for instance, may be employed for the control switch group 7. An electric circuit of the touch panel 22, which includes a transparent film and a glass substrate, is wired in directions of an X-axis and a Y-axis. The transparent film is placed on the glass substrate, which is in turn placed on a screen of the display device 10, with a gap called a spacer disposed between the transparent film and the glass substrate. When the user touches the transparent film, a part of a wiring that is being pressed by the user short-circuits, thereby changing a voltage. A so-called resistive method is widely used for detecting this voltage as a two-dimensional coordinate (X,Y). Alternatively, a so-called capacitive method may be employed for detecting a change of a capacitance as an electronic signal by a sensor, when a finger is brought close to a glass surface of a transparent conductive substrate, to which a substance that receives the electronic signal is applied. Besides the mechanical switch, a pointing device such as a mouse or a cursor may be alternatively used.

Using a microphone 31 and a voice recognition unit 30, various commands can be inputted. The voice recognition unit 30 processes a sound signal that has been inputted from the microphone 31 by means of voice recognition technologies such as a well-known hidden Markov model. Then the sound signal is converted into an operation command according to a result of the processing. The control switch group 7, the remote control terminal 12, and the microphone 31 allow the various commands to be inputted. In addition, the microphone 51 of the meter unit 50 may be employed as an alternative.

A transmitter-receiver 13 is a device for receiving vehicle information (road traffic information), for example, from a vehicle information, and communication system (VICS) center 14.

Furthermore, by communicating with an in-vehicle electronic toll collection (ETC) device 16, toll information or the like, which the in-vehicle ETC device 16 receives from an on-street ETC device (not shown), can be included in the navigation device 100. Alternatively, the transmitter-receiver 13 may communicate with the VICS center 14 by connecting the in-vehicle ETC device 16 to an external network.

The control circuit 8 is a character string converting device, and is configured as a normal computer. The control circuit 8 includes a CPU 81, a ROM 82, a RAM 83, an input/output circuit (I/O) 84, and a bus line 85 that connects the above elements to each other. The CPU 81 performs control, using data and a navigation program 21p that are stored in a HDD 21. The CPU 81 has read-write control of the data over the HDD 21. An A/D converting part 86 includes a well-known analog/digital (A/D) converter. The A/D converting part 86 converts, for example, analog data, which has been inputted into the control circuit 8 from the position sensor 1 and the like, into digital data that allows an operation by the CPU 81. In addition, the ROM 82 may store a program for a minimally necessary operation in case of a failure of the HDD 21, among navigation functions.

A drawing part 87 produces the drawing data to be displayed on the display device 10 or on the navigation display area 66 of the meter unit 50, based on display data and display color data that are stored in the HDD 21 and the like.

The HDD 21 is a map data storing device, or a character string conversion database. Besides the navigation program 21p, the HDD 21 stores map data 21m, which includes so-called map-matching data for the purpose of an accuracy improvement in position detection, and road data on a road juncture. The map data 21m stores information on a network of roads as well as predetermined map image information for display purposes. The information on the network of the roads includes link information, node information and the like. The link information is information on predetermined sectional roads that constitute each road, and includes a position coordinate, a distance, time required, road width, the number of lanes, a speed limit and the like. The node information defines an intersection (a branch road) and the like, and includes the position coordinate, the number of right- and left-turn lanes, a link to a road to be joined, and the like. Juncture information between the links is set for data, such as the data on whether or not to allow traffic.

Also, the HDD 21 stores user data 21u, into which extra information on routing assistance, entertainment information and the user's own data can be written. Contents of the user data 21u can be rewritten through operations of the control switch group 7, the touch panel 22 and the remote control terminal 12, or through a voice input from the microphone 31. Additionally, the HDD 21 may include a database 21d, which stores data required for an operation of the navigation device 100, and information of various sorts.

Data addition and update can be performed on the map data 21m and the user data 21u via the map data entry device 6, using a storage medium 20. Although given a data volume of the storage medium 20, a CD-ROM, a DVD or the like is generally used as the storage medium 20, other media such as a memory card may be used as the storage medium 20.

The nonvolatile memory 9 includes a random access memory (RAM) such as the EEPROM and a flash memory. The nonvolatile memory 9 stores information and data that are required for the operation of the navigation device 100. The nonvolatile memory 9 is designed to retain memory contents even if an accessory switch of the vehicle falls into an off-state, that is, the navigation device 100 is turned off.

Besides, as an alternative to the nonvolatile memory 9, the HDD 21 may store the information and the data that are required for the operation of the navigation device 100. Moreover, the information and the data that are required for the operation of the navigation device 100 may be stored in the nonvolatile memory 9 and the HDD 21 separately.

The display device 10 is configured using a well-known color liquid crystal display, and includes the driver circuit (not shown) for the purpose of controlling a dot matrix liquid crystal display (LCD) and an LCD. For instance, the active matrix drive system, which ensures that the target pixel is lit or extinguished by applying the transistor to each pixel, may be employed as the driver circuit, thereby performing display, on the basis of a display command and display screen data that have been produced at the control circuit 8. In addition, the organic electroluminescence (EL) indicator or the plasma indicator may be substituted for the display device 10.

The speaker 15 is connected to the well-known voice synthesis circuit 24, which is in turn connected to the I/O 84 of the control circuit 8. By a command of the navigation program 21p, digital voice data, which is stored in the nonvolatile memory 9 or in the HDD 21, is transformed into analog voice by the voice synthesis circuit 24, and the analog voice is emitted from the speaker 15. A recording and editing method, whereby a voice waveform that is directly accumulated or accumulated after encoding it is pieced together as required, for example, may be employed as a method for synthesizing voices. Besides, the speaker 52 of the meter unit 50 may be used as the speaker 15.

The speed sensor 23 includes a rotation detecting part such as a well-known rotary encoder. The speed sensor 23 is installed, for example, close to a wheel installation part in order to detect rotation of a wheel, and to input a result of this detection into the control circuit 8 as a pulse signal. In the control circuit 8, the number of revolutions of the vehicle wheel is converted into the vehicle speed, thereby calculating estimated arrival time from the present position of the vehicle to a destination, and an average vehicle speed according to each vehicle running section.

A LAN I/F 26 is an interface circuit to exchange data with the in-vehicle LAN 27. In addition, via the LAN I/F 26, the in-vehicle LAN 27 may capture data from the speed sensor 23, or may be connected to the in-vehicle ETC device 16.

By virtue of the above configuration, if the user chooses routing assistance processing from a menu displayed on the display device 10 through the operations of the control switch group 7, the touch panel 22 and the remote control terminal 12, or through the voice input from the microphone 31 in order to indicate a route to a destination on the display device 10 when the navigation program 21p is activated by the CPU 81 of the control circuit 8, the navigation device 100 performs the following processing.

First, the user chooses a certain point among arbitrary points on a map, points obtained as a result of retrieval of facilities and addresses, points registered by the user, and the like, and the user subsequently sets this point as his/her destination. The navigation device 100 obtains the present position of the vehicle by the position sensor 1, and obtains an optimal guidance route from the present position to the destination. Then, the guidance route is displayed on a road map on the display device 10 by adding the guidance route to the road map, thereby guiding the user to take an appropriate route. A Dijkstra method, for example, is known as the above method for automatically setting the optimal guidance route. The user is provided with guidance while operating the navigation device 100, and is informed of a message according to an operating state by means of at least one of the display device 10 and the speaker 15.

Figure 7:
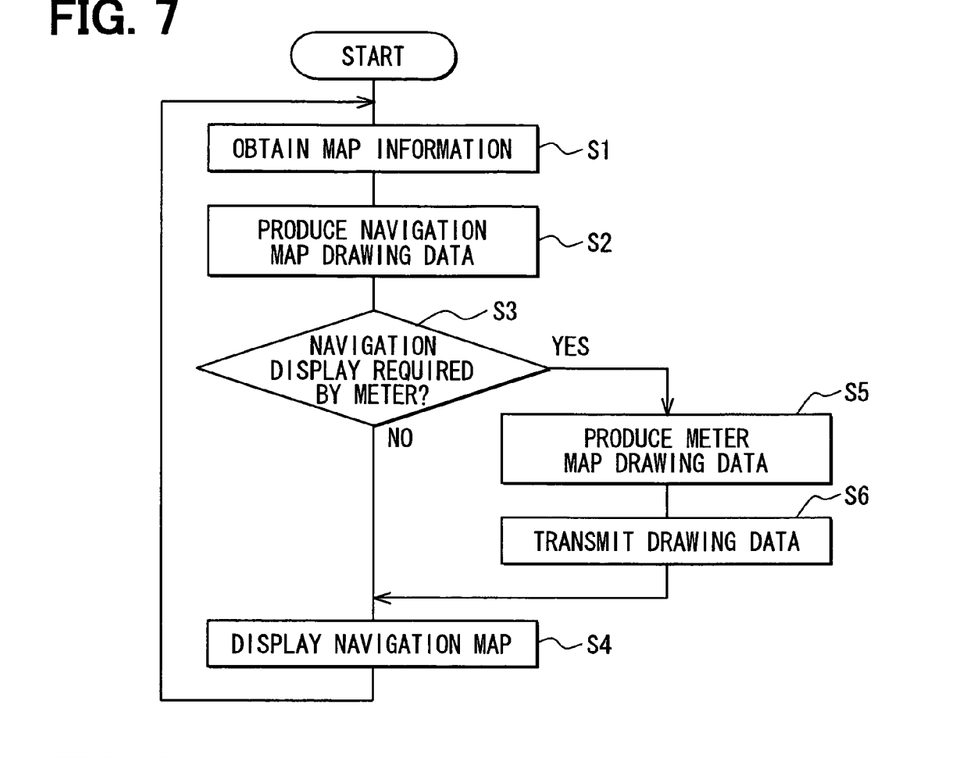
FIG. 7 is a flowchart showing character string conversion processing executed by an in-vehicle navigation device in the embodiment.

The navigation device 100, particularly the control circuit 8, performs character string conversion processing shown in FIG. 7 for the purpose of the display at the meter unit 50. The present processing is included in the navigation program 21p and is repeatedly performed with other programs than the navigation program 21p. Firstly, based on the present position of the vehicle, which has been detected by the position sensor 1, the map information on adjacencies to the present position of the vehicle is obtained (S1) from the map data 21m. Navigation map drawing data, which is used for the display on the display device 10 of the navigation device 100, is produced at step S2.

Secondly, whether or not METER (the meter ECU 40) requires navigation display (i.e., the navigation map drawing data) is checked. Data that has been inputted from the meter ECU 40 into the navigation device 100 via the in-vehicle LAN 27 is stored in a predetermined area of the RAM 83. Absence or presence of a navigation display request by the meter ECU 40 is indicated with a navigation display request flag, which is included in the data. If the navigation display is required, the navigation display request flag is set.

If the navigation display is required (S3: Yes), the character string conversion database, which is included in the map data 21m, is referred to. Then, the character string that is included in the navigation map drawing data is converted into the character string, which is to be displayed on the meter unit 50, thereby producing meter map drawing data (S5).

Figure 5:
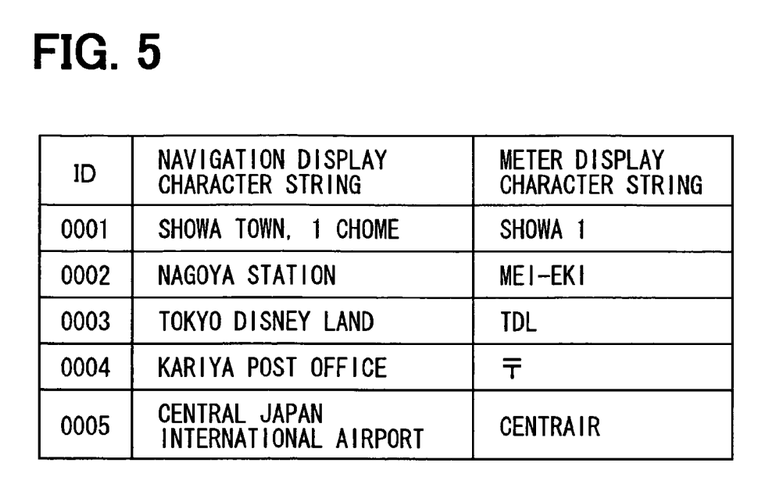
FIG. 5 is a table showing an exemplary character string conversion database in the embodiment.
Figure 6:
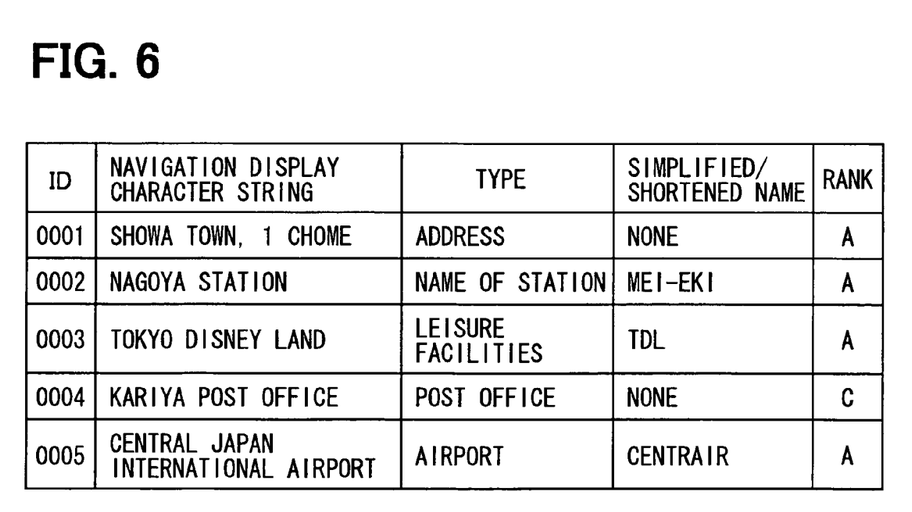
FIG. 6 is a table showing another exemplary character string conversion database in the embodiment.

The character string conversion database is illustrated with tables shown in FIGS. 5, 6. A left column of the table in FIG. 5 indicates a navigation display character string that is displayed on the display device 10 of the navigation device 100. A right column of the table in FIG. 5 indicates a meter display character string that is displayed on the meter unit 50 in the simplified form. The navigation and meter display character strings are stored separately, and are converted into character strings that correspond to displaying devices. Since the map data 21m includes the navigation display character string, an ID of the navigation display character string, which is included within a range of the map to be displayed, is searched when the meter ECU 40 requires the navigation display. Then, the meter display character string that corresponds to the ID is obtained from the character string conversion database in FIG. 5. For instance, the character string, "SHOWA TOWN, 1 CHOME" based on the navigation map drawing data may be converted into the character string, "SHOWA 1" based on the meter unit 50 map drawing data.

Alternatively, the character string conversion database, which is integrated with map data, may be stored as a database in the map data 21m or the database 21d of the HDD 21. As a result, the navigation map drawing data is stored separately from the meter map drawing data. When there is another display device, map drawing data that corresponds to this display device, as well as a display character string, is stored. In such a case, the meter map drawing data is produced, after selecting a range that is to be displayed on the meter unit 50 from meter display map data, when the meter ECU 40 requires the navigation display.

A conversion of the character string according to types of the navigation display character string is illustrated as a table shown in FIG. 6. The navigation display character string is stored with the ID, a type, a simplified/shortened name (e.g., a nickname and a well-accepted name), and a rank. The type is defined with respect to each category of geographical names, facilities and the like. The simplified/shortened name is stored if it exists, and otherwise stored as "NONE". The rank represents order of priority in displaying the character string on the meter unit 50. When displays of the meter map drawing data "SHOWA TOWN, 1 CHOME" and "KARIYA POST OFFICE" overlap, for example, only "SHOWA TOWN, 1 CHOME" (RANK A), which is higher in the rank, is displayed, whereas "KARIYA POST OFFICE" (RANK C), which is lower in the rank, is not displayed. In addition, a certain navigation display character string may be converted into the character string "NO CHARACTER" as "RANK D", for example. In other words, the rank, whereby the navigation display character string is not displayed on the meter unit 50, may be placed.

The conversion from the navigation display character string into the meter display character string may be carried out, for example, as described below.

(1) If the character string has a simplified/shortened name, it is converted into such a name.
(2) If the character string is expressible using a map symbol, it is converted into the map symbol.
(3) An address is converted, such that a street number and/or a block number included in the address are/is omitted.
(4) If the character string includes a name of an autonomous body (e.g., 'Nagoya art museum'), it is converted such that the name of the autonomous body is omitted (e.g., 'art museum').

Then, by bringing the character string, which has been converted, together with the map data, the meter map drawing data is produced. The meter map drawing data that has been produced is transmitted to the meter ECU 40 via the in-vehicle LAN 27 (S6). On the other hand, in the display device 10 of the navigation device 100, the navigation map drawing data that has been produced at step S2 is displayed (S4).

If the navigation display is not required (S3: No), the navigation map drawing data, which has been produced at step S2, is displayed in the display device 10 of the navigation device 100 (S4).

The above processing of FIG. 7 may be 'event initiated'. That is, when the navigation display is required by the meter ECU 40, the character string included in the navigation map drawing data is converted into the character string that is to be displayed on the meter unit 50, and the meter map drawing data is transmitted to the meter ECU 40. Instead of judging whether or not the navigation display is required (as a condition at S3), another method may be alternatively employed. That is to say, the conversion into the character string, and transmission to the meter ECU 40 may be performed with a predetermined timing (e.g., at a constant frequency).

Figure 8:
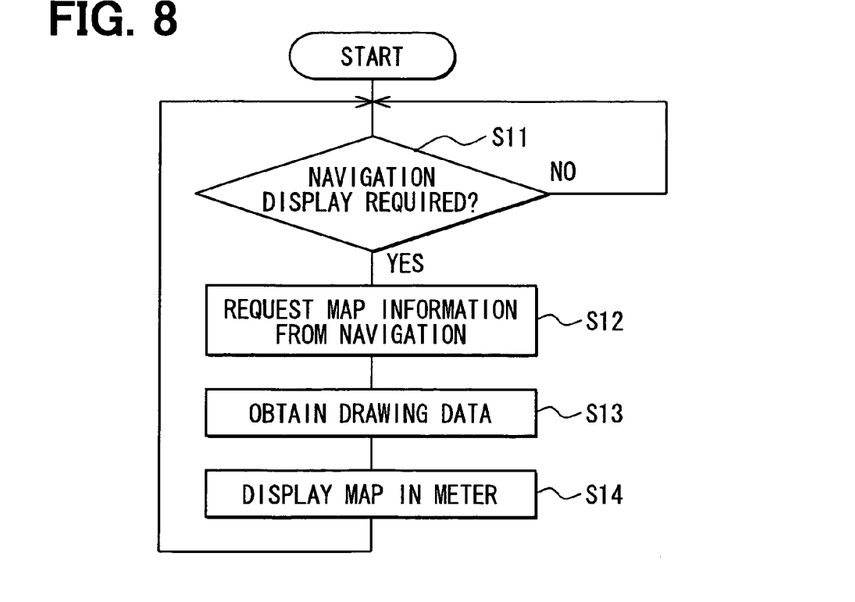
FIG. 8 is a flowchart showing drawing processing executed by a meter ECU in the embodiment.

The meter ECU 40 performs the drawing processing of meter display data as shown in FIG. 8. The present processing is included in the meter control program 41p and is repeatedly performed with other programs than the meter control program 41p. First, whether or not the navigation display is required at the meter unit 50 is checked. Then, if the navigation display is required (S11: Yes), the navigation display request, which requests the map information (i.e., the meter map drawing data), is transmitted to NAVIGATION (the navigation device 100) via the in-vehicle LAN 27 (S12).

Processing of steps S5, S6 (FIG. 7) is performed at the navigation device 100. The meter map drawing data, which has been produced and inputted into the meter ECU 40 as a result of steps S5, S6, is obtained by the drawing part 43

(S13). This meter map drawing data is combined with other drawing data such as those used for a speed meter, thereby producing the meter display data that is to be inputted into the meter unit 50. The meter unit 50 displays the meter display data, which has been inputted from the meter ECU 40 (S14).

Figure 9:
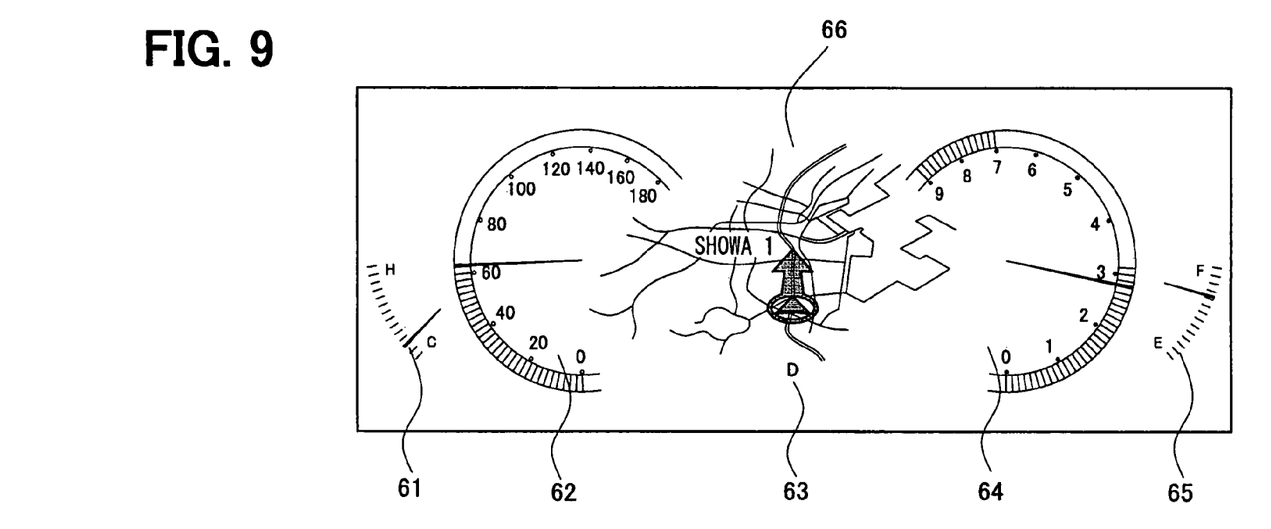
FIG. 9 is a schematic view showing an exemplary display of a meter, which employs the embodiment of the present invention.
Figure 10:
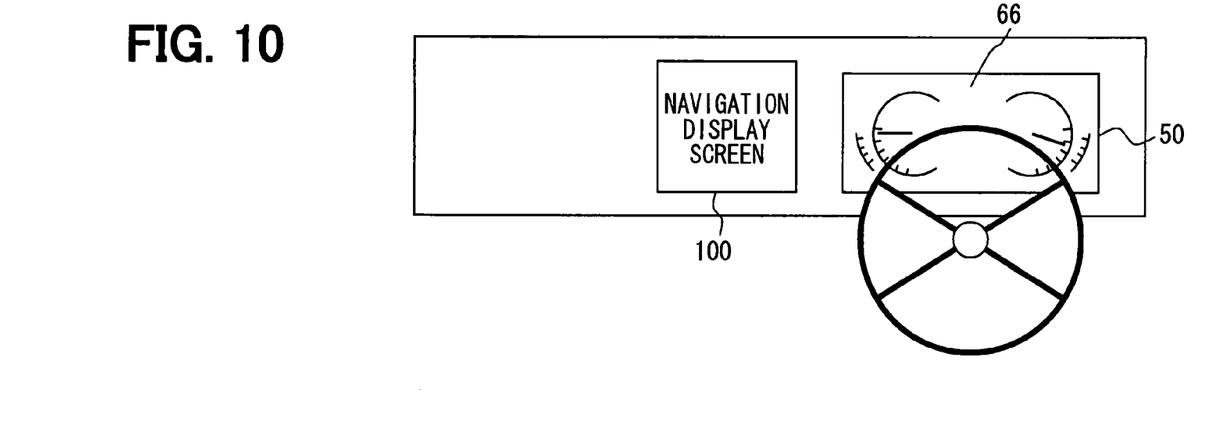
FIG. 10 is a schematic view showing an exemplary arrangement of a meter and an in-vehicle navigation device on an instrumental panel of a vehicle in the embodiment.

According to the embodiment, as shown in FIG. 9, the navigation display character string is converted (with such conditions as the simplified/shortened name and the rank included) into the meter display character string. Consequently, as shown in FIG. 9, only the character string "SHOWA 1" is displayed on the navigation display area 66. In the embodiment, both the meter unit 50 and the navigation device 100 may be provided on an instrumental panel of a vehicle as shown in FIG. 10. The navigation device 100, particularly a navigation display screen of the navigation device 100, is installed in the center of the instrumental panel. The character string displayed in the navigation display screen is converted into a new character string, which is displayed in the meter unit 50.

In the case of the conversion into the meter display character string, display design, such as a character color, a character size, a font and character decoration (e.g., a stereoscopic display, shadow-casting, bordering) may be converted. For instance, the character color after the conversion, the character size (an enlargement/reduction ratio) after the conversion, the font, the character decoration and the like may be registered in the character string conversion database shown in FIG. 6. Alternatively, the display design may be converted uniformly regardless of the types of character strings or the like.

Conditions of character string conversion may include dynamic information. The dynamic information includes the present position of the vehicle detected by the position sensor 1, the vehicle speed detected by the speed sensor 23, sparsity/density and scale of a map displayed on the display device 10, a roadway, time obtained from the GPS receiver 5 and the like, weather obtained from the VICS center 14 and the like, information the user has set and the like. Based on the dynamic information, the character strings are eclectically displayed, and a display method is changed. For example, if the present position of the vehicle is in an urban area, many geographical names and facilities are displayed, so that characters are highly likely to overlap. Thus, the character string to be displayed may be reduced, by raising a threshold of the rank of the character string to be converted, as a result of, for example, prioritizing a display of the geographical name. Also, if the vehicle speed is high, the display rapidly changes. Therefore, the character string to be displayed may be reduced, by raising the threshold of the rank of the character string to be converted, in consequence of, for instance, preferentially displaying the geographical names and the facilities adjacent to a travel route.

(Modification 1)

The character string conversion processing may be performed at the meter ECU 40. To employ such a configuration, step S5 in FIG. 7 is not performed by the navigation program 21p, and the navigation map drawing data is directly inputted into the meter ECU 40. Then, at the meter control program 41p after step S13 in FIG. 8, production (that corresponds to step S5 in FIG. 7) of the meter map drawing data is carried out, thereby converting the character string included in the navigation map drawing data, and producing the meter map drawing data. The character string conversion database is stored in the external memory 45.

(Modification 2)

Furthermore, The character string conversion processing may be performed both at the navigation device 100 and at the meter ECU 40. To employ such a configuration, at the meter control program 41p after step S13 in FIG. 8, the production (that corresponds to step S5 in FIG. 7) of the meter map drawing data is carried out. Then, the character string included in meter map drawing data (in which the character string has already been converted), which has been inputted from the navigation device 100, is converted again, thereby producing new meter map drawing data. The character string conversion database is stored in the external memory 45 as well.

Thus far, the embodiments of the present invention have been described. However, they are no more than illustrations, and thus the present invention is not by any means limited to them. Various changes based on knowledge of those skilled in the art may be made without departing from the scope of the claims.

Additional advantages and modifications will readily occur to those skilled in the art. The invention in its broader terms is therefore not limited to the specific details, representative apparatus, and illustrative examples shown and described.

What is claimed is:

1. A vehicular display system comprising:
an in-vehicle navigation device; and
a vehicular meter device, wherein:
the in-vehicle navigation device includes:
a display for displaying first map data, wherein:
the first map data includes first character string data;
a character string storage for configured to store the first map data that is to be displayed on the display; and
a transmitter configured to transmit map data to the vehicular meter device;
the vehicular meter device includes:
a receiver configured to receive the map data from the in-vehicle navigation device; and
a navigation display area for displaying second map data, wherein:
the second map data includes second character string data; and
a character string converter configured to convert the first map data into the second map data is included in at least one of the following devices:
the in-vehicle navigation device; and
the vehicular meter device, wherein:
the second character string data is displayed in a simpler form than the first character string data in the navigation display area.

2. The vehicular display system according to claim 1, wherein:
the character string converter is included in the in-vehicle navigation device;
the first character string data is navigation display character string data;
the second character string data is meter display character string data; and
the second map data is:
transmitted to the vehicular meter device by the transmitter; and
received from the in-vehicle navigation device by the receiver.

3. The vehicular display system according to claim 2, wherein:
the character string onvcrter includes a character string conversion database, wherein:
the character string conversion database includes:

the navigation display character string data; and
the meter display character string data; and
the navigation display character string data is converted by the character string converter based on the character string conversion database.

4. The vehicular display system according to claim 2, wherein:
the character string converter includes a character string conversion database, wherein:
the character string conversion database is included in a map data storage for storing electronic map data; and
the map data storage is further included in the in-vehicle navigation device; and
the navigation display character string data is converted by the character string converter based on the character string conversion database.

5. The vehicular display system according to claim 1, wherein:
the character string converter is included in the vehicular meter device;
the first character string data is navigation display character string data;
the second character string data is meter display character string data; and
the first map data is:
transmitted to the vehicular meter device by the transmitter; and
received from the in-vehicle navigation device by the receiver.

6. The vehicular display system according to claim 1, wherein:
the character string converter is included in:
the in-vehicle navigation device, wherein:
the first character string data is navigation display character string data; and
the second character string data is predetermined character string data, which is included in predetermined map data; and
the vehicular meter device, wherein:
the first character string data is the predetermined character string data; and
the second character string data is meter display character string data; and
the predetermined map data is:
transmitted to the vehicular meter device by the transmitter; and
received from the in-vehicle navigation device by the receiver.

7. The vehicular display system according to claim 6, wherein:
the character string converter, which is included in the in-vehicle navigation device, includes a character string conversion database, wherein:
the character string conversion database includes:
the navigation display character string data; and
the meter display character string data; and
the navigation display character string data is converted by the character string converter based on the character string conversion database.

8. The vehicular display system according to claim 6, wherein:
the character string converter, which is included in the in-vehicle navigation device, includes a character string conversion database, wherein:
the character string conversion database is included in a map data storage for storing electronic map data; and
the map data storage is further included in the in-vehicle navigation device; and
the navigation display character string data is converted by the character string converter based on the character string conversion database.

9. The vehicular display system according to claim 1, wherein a number of characters included in the first character string data is converted by the character string converter.

10. The vehicular display system according to claim 1, wherein display design of the first character string data is converted by the character string converter.

11. The vehicular display system according to claim 1, wherein:
the character string converter includes a character string conversion database; and
the first character string data is converted by the character string converter based on the character string conversion database.

12. The vehicular display system according to claim 11, wherein:
the character string conversion database includes a character string converting rank; and
the first character string data is converted by the character string converter based on the character string converting rank.

13. The vehicular display system according to claim 1, wherein:
the vehicular display system includes a dynamic information obtaining device configured to obtain dynamic information about a vehicle; and
the character string converter converts the first character string data, based on the dynamic information, which has been obtained by the dynamic information obtaining device.

14. The vehicular display system according to claim 1, wherein:
the second character string data displayed in the simpler form is different from the first character string data in at least one of the following characteristics:
a character color;
a character size; and
a font.

15. A vehicular meter device comprising:
a receiver configured to receive first map data from an output medium, wherein;
the first map data includes first character string data;
a character string converter for converting the first map data into second map data, wherein:
the second map data includes second character string data; and
a navigation display area for displaying the second map data, wherein:
the second character string data is displayed in a simpler form than the first character string data in the navigation display area.

16. A method for displaying a travel guidance map in a vehicle that has a navigation system and a meter display device, the method comprising:
producing display data including map data of a travel guidance map and first character string data indicative of a specified name for an indication of the specified name in a first form on the travel guidance map, the map data and the first character string data being stored in a memory of the navigation system;
converting the produced character string data into a second character string data to indicate the specified name in a second form simpler than the first form;

displaying, in a meter display device, both the travel guidance map and the specified name in the second form based on the map data and the second character string data in addition to predetermined display items of the meter display device.

17. The method according to claim 16 further comprising:

displaying, in a navigation system display device provided separately from the meter display device, both the travel guidance map and the specified name in the first form based on the map data and the first character string data.

18. The method according to claim 16, wherein:

the converting uses a pre-stored conversion table between the first form and the second form.

\* \* \* \* \*